United States Patent Office.

RUDOLPH D'HEUREUSE, OF NEW YORK, N. Y.

*Letters Patent No. 99,541, dated February 8, 1870.*

IMPROVEMENT IN MALTING GRAIN.

The Schedule referred to in these Letters Patent and making part of the same.

*To all whom it may concern:*

Be it known that I, RUDOLPH D'HEUREUSE, of the city, county, and State of New York, have invented a new and useful Improvement in Malting Grain; and I do hereby declare that the following is a full, clear, and exact description thereof, which will enable others skilled in the art to make and use the same.

This improvement is devised to better control the time in steeping grain for malt and other purposes, preparatory to the process of germinating the grain, and thus to economize in time and apparatus, and to keep the whole process of steeping and germinating under more perfect control than can be done in the usual rude manner.

In the prevalent mode of steeping the grain, water from any convenient wells or city-supplies, without further preparation, is admitted at the top of the steep-tank, generally of a temperature little suited to quickly penetrate, steep, and swell the grain. In consequence, a long time is required for steeping and swelling, or by the fluctuations in the temperature and the chemical composition of the steep-water in the various seasons or localities, great difficulty is experienced to control the time for steeping, which, according to the temperature, may take from twenty-four to seventy and more hours, while the swelling still remains imperfect.

Unless uniformity and reliability in this process are secured, the subsequent operations are conducted only with considerable uncertainty and difficulty, to insure a good malt.

When, in winter, the grain is very cold, and cold supply-water is used, freezing in the steep frequently occurs, slow or no progress is made in steeping, so that a correspondingly large number of steep-tanks is needed now in malting-establishments, and much time lost subsequently in raising the temperature of the grain sufficiently for germination.

To save all this uncertainty, time, supervision, expense, and room for excess of steep-tanks, and render the process of steeping independent from the inclemency of the season, in fact, to intelligently do the work, I propose to employ a temperature of the grain in the steep most suitable for the performance of the operation, so that, if the grain be very cold, the temperature is gradually raised to that most effectual for the process, which temperature lies between 55° and 70° Fahrenheit. Below 45° the action is slow, above 75°, injurious to the health of the grain. Also, there may be added to or extracted from the water, such ingredients, whose presence or absence contributes to facilitate the process. Acidifying or excess of metallic matters should be avoided, a slight alkaline reaction favored. A circulating movement of the steep-water is also found of advantage, and may be promoted by injecting from below, steep-water, of proper temperature, or by impelling air into the steep at or near the bottom, the temperature of the grain in the steep to be raised or sustained by supply of steep-water of proper temperature, or by dry-heating arrangements by steam or water, by injection of steam directly, or in any other manner. In this way, the time for steeping and swelling can be uniformly controlled, not to exceed twenty-four to thirty hours, at any season of the year, and no further time need to be lost in the subsequent germination, which should be performed by currents of air of proper temperature and moisture, so as to make all parts of the process of malting perfectly independent from the climate or season of the year, and to insure the most perfect control.

By employing proper temperature, the steeping of the grain may also be performed in the course of a few hours, in closed vessels, under increased hydrostatic pressure.

Having thus described my invention,

I claim as new, and desire to secure by Letters Patent—

The mode of controlling or accelerating the process of steeping grain for malt or other purposes, first, by regulating the temperature of the grain in the steep; second, by admitting the steep-water into the steep at or near the bottom; third, by adding such chemicals, or to prepare the steep-water in such a manner as will be found most effectual to quickly do the work; all of which, either separately or jointly done, substantially as hereinbefore described, and for the purposes set forth.

The above specification of my invention signed by me, this 28th day of December, 1869.

R. D'HEUREUSE.

Witnesses:
 GEO. W. MABEE,
 ALEX. F. ROBERTS